United States Patent
Mullen et al.

(10) Patent No.: US 10,470,250 B2
(45) Date of Patent: Nov. 5, 2019

(54) CARBON ALLOTROPE HEATER MATERIAL WITH RESISTIVITY RANGES SUITED FOR AIRCRAFT ICE PROTECTION

(71) Applicant: Goodrich Corporation, Charlotte, NC (US)

(72) Inventors: James A. Mullen, Wadsworth, OH (US); Jin Hu, Hudson, OH (US); Galdemir Cezar Botura, Akron, OH (US); Zaffir A. Chaudhry, S. Glastonbury, CT (US); Wenping Zhao, Glastonbury, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/373,372

(22) Filed: Dec. 8, 2016

(65) Prior Publication Data

US 2018/0168003 A1 Jun. 14, 2018

(51) Int. Cl.
| | | |
|---|---|---|
| *H05B 3/14* | (2006.01) | |
| *H05B 3/10* | (2006.01) | |
| *H05B 3/12* | (2006.01) | |
| *H05B 3/20* | (2006.01) | |
| *B64D 15/12* | (2006.01) | |
| *H05B 3/26* | (2006.01) | |

(52) U.S. Cl.
CPC ............ *H05B 3/145* (2013.01); *B64D 15/12* (2013.01); *H05B 3/262* (2013.01); *H05B 2203/013* (2013.01); *H05B 2214/02* (2013.01); *H05B 2214/04* (2013.01); *Y02T 50/54* (2013.01)

(58) Field of Classification Search
CPC ... H05B 3/10; H05B 3/12; H05B 3/14; H05B 3/145; H05B 3/146; H05B 3/20; H05B 3/28
See application file for complete search history.

(56) References Cited

U.S. PATENT DOCUMENTS

| | | | | |
|---|---|---|---|---|
| 8,664,573 B2 * | 3/2014 | Shah | ........................ | B64D 15/12 |
| | | | | 219/482 |
| 8,919,494 B2 * | 12/2014 | Burkett | ................... | H01C 17/02 |
| | | | | 181/284 |
| 2010/0126981 A1 | 5/2010 | Heintz et al. | | |
| 2014/0034633 A1 | 2/2014 | Heintz et al. | | |
| 2014/0070054 A1 | 3/2014 | Burton et al. | | |
| 2016/0221680 A1 | 8/2016 | Burton et al. | | |

FOREIGN PATENT DOCUMENTS

| | | |
|---|---|---|
| WO | WO2016081690 A1 | 5/2016 |
| WO | WO2016126827 A1 | 8/2016 |
| WO | WO2016144683 A1 | 9/2016 |

OTHER PUBLICATIONS

Kim Lynge Sorensen et al., "Carbon nanomaterial-based wing temperature control system for in-flight anti-icing and de-icing of unmanned aerial vehicles," 2015 IEEE Aerospace Conference, Mar. 7, 2015, pp. 1-6.

Ling Liu et al., "Correlation between Porosity and Electrical-Mechanical Properties of Carbon Nanotube Buckpaper with Various Porosities," Journal of Nanomaterials, vol. 2015, Jan. 1, 2015, pp. 1-9.

Yonggang Yao et al., "Carbon Welding by Ultrafast Joule Heating," Nano Letters, vol. 16, No. 11, Oct. 17, 2016, pp. 7282-7289.

Extended European Search Report for EP Application No. 17206204.4, dated Mar. 2, 2018, 14 Pages.

Communication Pursuant to Article 94(3) EPC for EP Application No. 17206204.4, dated Apr. 15, 2019, pp. 5.

* cited by examiner

*Primary Examiner* — Michael A Laflame, Jr.
(74) *Attorney, Agent, or Firm* — Kinney & Lange, P.A.

(57) ABSTRACT

A carbon allotrope heating element includes an electrical resistivity between 0.005 ohms per square ($\Omega$/sq) and 3.0 $\Omega$/sq. A heating system includes a component and a carbon allotrope heating element having an electrical resistivity between 0.005 $\Omega$/sq and 3.0 $\Omega$/sq. A method includes modifying a carbon allotrope heating element to have an electrical resistivity between 0.005 $\Omega$/sq and 3.0 $\Omega$/sq and applying the carbon allotrope heating element to a component of an aircraft.

7 Claims, No Drawings

CARBON ALLOTROPE HEATER MATERIAL WITH RESISTIVITY RANGES SUITED FOR AIRCRAFT ICE PROTECTION

BACKGROUND

Carbon nanotubes (CNTs) are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. This makes the use of CNTs of particular interest for applications where weight is critical, such as in aerospace and aviation technologies.

Carbon nanotubes are commercially available in several different forms; however, these off-the-shelf CNTs are not suitable for all aircraft ice protection applications. One such form is as a CNT yarn. Carbon nanotube yarn includes aligned bundles of CNTs that are hundreds of microns in diameter and millimeters long. In a CNT yarn, carbon nanotubes are spun into long fibers and can be plied together or stretched to provide the desired length and mechanical properties. However, while CNT yarns have been used in heating elements, they have first been incorporated into a substrate film. Incorporating the CNT yarn into a film reduces some of the flexibility that CNTs provide. For example, CNT films typically contain air voids that increase the electrical resistivity (and reduce the conductivity) of the CNT film. As a result, CNT yarns incorporated into a film may not provide the level of electrical resistivity necessary for many aerospace heating applications (e.g., anti-icing and de-icing). Thus, forming a film with a commercially available CNT yarn cannot currently be used as a substitute for metal heating elements.

Other forms include pure carbon nanotube nonwoven sheet material (CNT-NSM) and CNT-filled thermoplastic films. In a CNT-NSM, carbon nanotubes are arranged together to form a sheet. No adhesives or polymers are typically used to attach CNTs to one another in a CNT-NSM. Instead, CNT particles are attached to one another via Van der Waals forces. In a CNT-filled thermoplastic film, individual CNT particles are distributed throughout the film. Unfortunately, these commercially available CNT materials do not offer off-the-shelf electrical resistivities that allow for their use in different ice protection applications. For example, the electrical resistivity of commercially available, CNT-filled thermoplastic films is generally in the range of $3 \times 10^{-4}$ ohms-cm ($\Omega$-cm) or higher and the electrical conductivity of commercially available, off-the-shelf CNT-NSMs is generally in the range of 350-400 S/cm or lower. These levels of electrical resistivity are not suitable for many aerospace heating applications. Thus, commercially available CNT-filled thermoplastic films and CNT-NSMs cannot currently be used as a substitute for metal heating elements.

SUMMARY

A carbon allotrope heating element includes an electrical resistivity between 0.005 ohms per square ($\Omega$/sq) and 3.0 $\Omega$/sq.

A heating system includes a component and a carbon allotrope heating element having an electrical resistivity between 0.005 $\Omega$/sq and 3.0 $\Omega$/sq.

A method includes modifying a carbon allotrope heating element to have an electrical resistivity between 0.005 $\Omega$/sq and 3.0 $\Omega$/sq and applying the carbon allotrope heating element to a component of an aircraft.

DETAILED DESCRIPTION

The present disclosure provides carbon allotrope heating elements having acceptable electrical resistivities for use in aircraft ice protection applications. Carbon allotrope heating elements having the disclosed electrical resistivities can be used as replacements for metal alloy resistive heating elements and other conventional heaters. Commercially available carbon allotropes can be modified by the methods described herein to possess the disclosed electrical resistivities.

Carbon allotrope materials, like carbon nanotubes (CNTs), can be used as heating elements for aircraft ice protection (e.g., anti-icing and de-icing). Commercially available carbon allotrope materials generally include CNT yarn, CNT sheets (CNT-NSMs) and CNT-filled films. These carbon allotrope materials typically require one or more modifications to make them suitable for aircraft ice protection. For example, the carbon allotrope materials must be attached onto or embedded into the aircraft component that will receive ice protection. In some cases, this can be done by simply adhering the carbon allotrope materials to the component, or it can include inserting the carbon allotrope materials into one or more plies of a composite laminate system that is attached to the component.

Another modification includes connecting the carbon allotrope materials to a power source and other heating elements so that electric current can be passed through the carbon allotrope materials to generate heat. Application Ser. No. 15/368,255, which was filed on Dec. 2, 2016, titled "Method to Join Nano Technologies Heaters for Ice Protection", and hereby incorporated by reference in its entirety, describes ways to electrically connect CNT heating elements.

A further modification is adjusting the electrical resistivity of the carbon allotrope materials so that they are suitable for providing ice protection to the desired aircraft component. Different aircraft components can have differing ice protection needs. For instance, due to size constraints, fan blades might only include CNT heating elements while a wing might include CNT heating elements in addition to other means for preventing and reducing ice accumulation. The CNT heating elements on the fan blades will have electrical resistivities to ensure ice accumulation does not occur on any of the airfoils. Meanwhile, the CNT heating elements on the wing might only need to provide ice protection to a particular zone while other systems provide general ice protection. Since the CNT heating elements on these components can serve different purposes, their electrical resistivities can also differ.

Different aircraft types can also have varying types of power sources available for running ice protection systems. Small aircraft and unmanned aerial vehicles (UAVs) typically use 28 volt (V) direct current (DC) power. Helicopters often use 115 V alternating current (AC) power or 270 V DC power, and commercial turbofan and turboprop aircraft typically use 115 V AC power, 230 V AC power or 208 V DC power. More Electric Aircraft (MEA) concepts have also explored using 270 V DC power and 540 DC power. The electrical resistivity of the carbon allotrope materials used in heating elements can be modified so that they are compatible with the existing power source on a given aircraft. For instance, a suitable range of electrical resistivity for carbon allotrope heating elements used for rotor blade ice protection on a commercial aircraft is between about 0.01 ohms per square (Ω/sq) and about 0.05 Ω/sq. A suitable range of electrical resistivity for carbon allotrope heating elements used for wing ice protection on a commercial aircraft is between about 0.05 Ω/sq and about 3.0 Ω/sq. A suitable range of electrical resistivity for carbon allotrope heating elements used for propeller ice protection on a commercial aircraft is between about 0.06 Ω/sq and about 0.75 Ω/sq. A suitable range of electrical resistivity for carbon allotrope heating elements used on small (commuter) aircraft and UAVs is between about 0.005 Ω/sq and about 1.0 Ω/sq.

The electrical resistivity of carbon allotropes can be modified to accommodate these ranges according to a number of complementary disclosures. For example, application Ser. No. 15/373,320, which was filed on Dec. 8, 2016, titled "Pressurized Reduction of CNT Resistivity", and hereby incorporated by reference in its entirety, describes methods for reducing the electrical resistivity of CNT-NSMs. Application Ser. No. 15/373,371, which was filed on Dec. 8, 2016, titled "Reducing CNT Resistivity by Aligning CNT Particles in Films", and hereby incorporated by reference in its entirety, describes methods for reducing the electrical resistivity of thermoplastic films containing CNTs. Application Ser. No. 15/373,368, which was filed on Dec. 8, 2016, titled "Carbon Nanotube Yarn Heater", and hereby incorporated by reference in its entirety, describes heating elements containing CNT yarn and methods of making the same. Application Ser. No. 15/373,363, which was filed on Dec. 8, 2016, titled "Adjusting CNT Resistance Using Perforated CNT Sheets", and hereby incorporated by reference in its entirety, describes heating elements with perforated regions and methods of making the same, where the perforations are used to tube the electrical resistivity of the heating elements. Application Ser. No. 15/368,271, which was filed on Dec. 2, 2016, titled "Method to Create Carbon Nanotube Heaters with Varying Resistance", and hereby incorporated by reference in its entirety, describes methods for making CNT heater assemblies having varying electrical resistance based on changes in localized heater thickness and/or curvature. One or more of these methods can be used to tune the electrical resistivity of a carbon allotrope heating element so that it matches the necessary range for the aircraft and the component it is to protect.

While the instant disclosure refers particularly to carbon nanotubes in some embodiments, it is theorized that materials containing other electrically conductive carbon allotropes (e.g., graphene, graphene nanoribbons, etc.) would behave in a similar fashion. Embodiments containing other suitable carbon allotropes are within the scope of the instant disclosure.

The structures and methods disclosed herein provide means for preparing carbon allotrope heating elements suitable for ice protection applications on aircraft.

Discussion of Possible Embodiments

The following are non-exclusive descriptions of possible embodiments of the present invention.

A carbon allotrope heating element can have an electrical resistivity between 0.005 ohms per square (Ω/sq) and 3.0 Ω/sq.

The heating element of the preceding paragraph can optionally include, additionally and/or alternatively, any one or more of the following features, configurations and/or additional components:

The carbon allotrope heating element can be a modified commercially available carbon allotrope.

The heating element can contain a reduced number and/or size of air voids than the commercially available carbon allotrope.

The heating element can include a plurality of perforations.

The heating element can include aligned carbon nanotubes in a thermoplastic film.

A heating system can include a component and a carbon allotrope heating element having an electrical resistivity between 0.005 Ω/sq and 3.0 Ω/sq.

The heating system of the preceding paragraph can optionally include, additionally and/or alternatively, any one or more of the following features, configurations and/or additional components:

The component can be a rotor blade and the carbon allotrope heating element can have an electrical resistivity between 0.01 Ω/sq and 0.05 Ω/sq.

The component can be a wing and the carbon allotrope heating element can have an electrical resistivity between 0.05 Ω/sq and 3.0 Ω/sq.

The component can be a propeller and the carbon allotrope heating element can have an electrical resistivity between 0.06 Ω/sq and 0.75 Ω/sq.

The component can be located on a commuter aircraft and the carbon allotrope heating element can have an electrical resistivity between 0.005 Ω/sq and 1.0 Ω/sq.

The component can be located on an unmanned aerial vehicle and the carbon allotrope heating element can have an electrical resistivity between 0.005 Ω/sq and 1.0 Ω/sq.

A method can include modifying a carbon allotrope heating element to have an electrical resistivity between 0.005 Ω/sq and 3.0 Ω/sq and applying the carbon allotrope heating element to a component of an aircraft.

The method of the preceding paragraph can optionally include, additionally and/or alternatively, any one or more of the following features, configurations and/or additional components:

The component can be a rotor blade and the carbon allotrope heating element can have an electrical resistivity between 0.01 Ω/sq and 0.05 Ω/sq.

The component can be a wing and the carbon allotrope heating element can have an electrical resistivity between 0.05 Ω/sq and 3.0 Ω/sq.

The component can be a propeller and the carbon allotrope heating element can have an electrical resistivity between 0.06 Ω/sq and 0.75 Ω/sq.

The component can be located on a commuter aircraft and the carbon allotrope heating element can have an electrical resistivity between 0.005 Ω/sq and 1.0 Ω/sq.

The component can be located on an unmanned aerial vehicle and the carbon allotrope heating element can have an electrical resistivity between 0.005 Ω/sq and 1.0 Ω/sq.

The step of modifying the carbon allotrope heating element can be selected from the group consisting of reducing a number and/or size of air voids in the carbon allotrope heating element, perforating the carbon allotrope heating element, aligning carbon nanotubes in the carbon allotrope heating element by joule heating the carbon allotrope heating element, adjusting a thickness of the carbon allotrope heating element and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   reducing a number and/or size of air voids in a carbon allotrope heating element to have an electrical resistivity between 0.005 Ω/sq and 3.0 Ω/sq; and
   applying the carbon allotrope heating element to a component of an aircraft.

2. The method of claim 1, wherein the component is a rotor blade and the carbon allotrope heating element has an electrical resistivity between 0.01 Ω/sq and 0.05 Ω/sq.

3. The method of claim 1, wherein the component is a wing and the carbon allotrope heating element has an electrical resistivity between 0.05 Ω/sq and 3.0 Ω/sq.

4. The method of claim 1, wherein the component is a propeller and the carbon allotrope heating element has an electrical resistivity between 0.06 Ω/sq and 0.75 Ω/sq.

5. The method of claim 1, wherein the component is located on a commuter aircraft and the carbon allotrope heating element has an electrical resistivity between 0.005 Ω/sq and 1.0 Ω/sq.

6. The method of claim 1, wherein the component is located on an unmanned aerial vehicle and the carbon allotrope heating element has an electrical resistivity between 0.005 Ω/sq and 1.0 Ω/sq.

7. A method comprising:
   perforating a carbon allotrope heating element to have an electrical resistivity between 0.005 Ω/sq and 3.0 Ω/sq; and
   applying the carbon allotrope heating element to a component of an aircraft.

* * * * *